United States Patent [19]

Van Marcke

[11] Patent Number: 4,819,682

[45] Date of Patent: Apr. 11, 1989

[54] PNEUMATICALLY OPERABLE VALVE

[76] Inventor: Karel C. Van Marcke, Kasteelstratt 7, B-9770, Kruishoutem, Belgium

[21] Appl. No.: 864,537

[22] Filed: May 19, 1986

[51] Int. Cl.⁴ .................... F16K 31/145; F16K 31/08
[52] U.S. Cl. ........................................ 137/1; 251/65; 251/57; 251/14; 251/45; 251/47
[58] Field of Search .................. 251/65, 57, 14, 45, 251/47; 137/1

[56] References Cited

U.S. PATENT DOCUMENTS

| | | | |
|---|---|---|---|
| 3,208,471 | 9/1965 | Olsen | 251/65 X |
| 3,212,751 | 10/1965 | Hassa | 251/65 |
| 4,606,339 | 8/1986 | Walther | 251/65 X |
| 4,630,644 | 12/1986 | Hafner et al. | 251/65 X |

Primary Examiner—Arnold Rosenthal
Attorney, Agent, or Firm—Cahill, Sutton & Thomas

[57] ABSTRACT

A push-button operated valve having an optional metering control for regulating the open state of the valve includes optional pneumatic actuation in response to a source of either pressure or vacuum while retaining the metering capability. A plurality of diaphragms, responsive to either mechanically induced or pneumatically induced forces, relocate a magnet for magnetically opening the valve to permit fluid flow therethrough and for controlling closure of the valve in response to the presence of the metering control, which metering control has an adjustable response period.

28 Claims, 4 Drawing Sheets

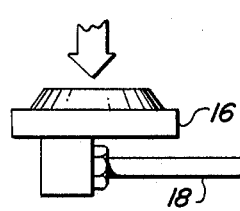
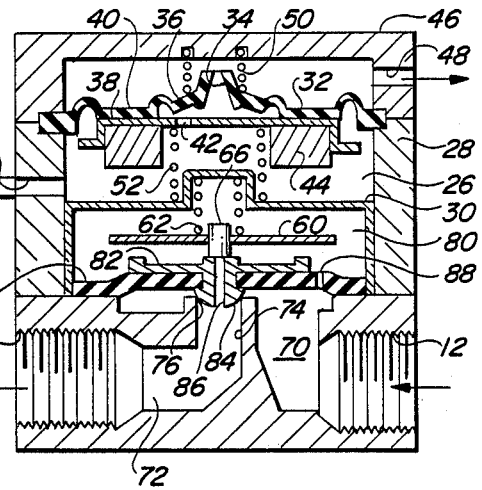
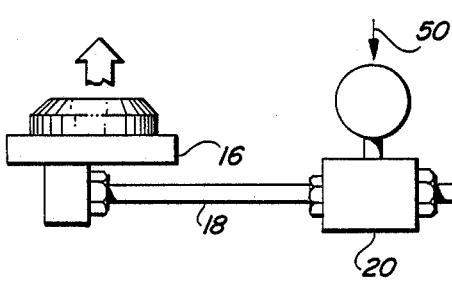
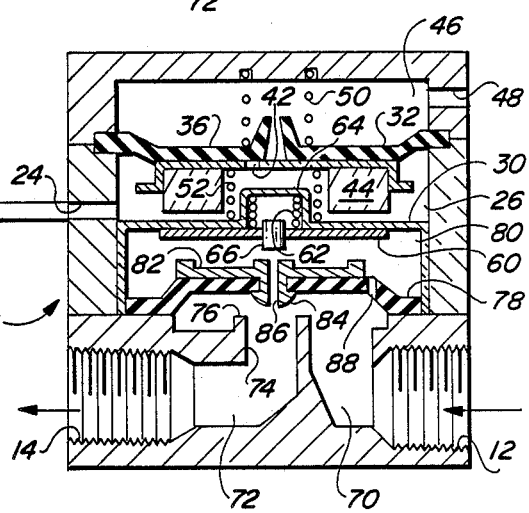
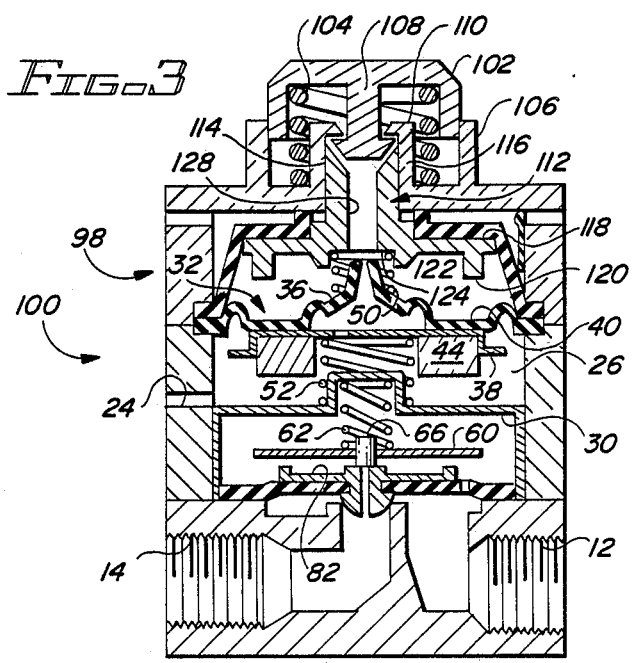
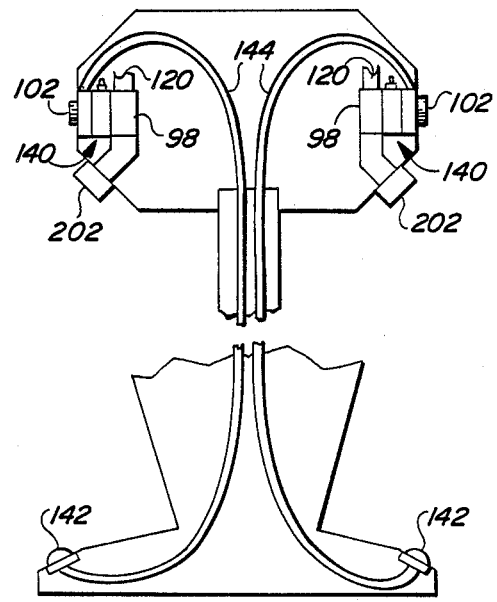

PNEUMATICALLY OPERABLE VALVE

The present invention relates to fluid flow valves and, more particularly, to mechanical and pneumatic apparatus for actuating a magnetically operated fluid flow valve.

Magnetically operated valves have been developed for the purpose of segregating the fluid flowing therethrough from the control elements of the valve. This feature is of particular import where the fluid is corrosive or tends to leave particulate matter upon the surfaces with which it may come in contact. A valve of this type is manufactured by Huba Control AG of Würenlos, Switzerland. In this valve, actuation of a pneumatically connected button forces air through the control mechanism and upon release of the button, air is drawn from the control mechanism to establish a below ambient pressure within one of the compartments of the control mechanism. The reduced pressure results in movement of a diaphragm to reposition a magnet. Upon repositioning of the magnet, a magnetically responsive disc is raised to open the valve and permit fluid communication between the inlet and the outlet of the valve. A metering device is connected to the below ambient pressure cavity of the control mechanism to permit a controlled air flow thereinto. As the air pressure within the cavity increases to near ambient air pressure, a bias spring acting upon the magnet will raise the magnet out of magnetic influence upon the disc. A resulting reduced magnetic attraction on the disc will permit a further bias spring acting upon the disc to reposition it downwardly and close the valve to stop further fluid flow between the inlet and the outlet.

As is evident from the above description, mechanical means for actuating the valve are not available. Furthermore, the degree of below ambient pressure available from relatively inexpensive mechanical actuators is limited. Any leaks in the pneumatic system will jeopardize the effectiveness of the valve to a substantial extent and possibly of being inoperable for the propeses intended.

It is therefore a primary object of the present invention to provide an actuating system for a valve which system may be actuated mechanically and pneumatically.

Another object of the present invention is to provide two different modes for effecting mechanical actuation of a valve.

Yet another object of the present invention is to provide a mechanically or pneumatically operated valve wherein the pneumatic operation may be effected by a source of the above or below ambient air pressure.

Still another object of the present invention is to provide an actuating system for a valve having two modes of mechanical actuation and two modes of pneumatic actuation which are not mutually exclusive and which may be operated simultaneously.

A further object of the present invention is to provide a mechanical and a pneumatic actuation system for a valve which allows the valve to be maintained open at will by continuous actuation of the valve actuation system.

A yet further object of the present invention is to provide a mechanical and pneumatical actuation system for a valve having a metering control mechanism for setably varying the duration the valve is open.

A still further object of the present invention is to provide a repetively operable pneumatic actuation system for a valve which is operable even if the actuation system is subjected to pneumatic leakage.

A still further object of the present invention is to provide a mechanical or pneumatical actuation system for a valve which uses magnetic forces to control fluid flow through the valve.

A still further object of the present invention is to provide a method for mechanically and pneumatically actuating a magnetically responsive fluid flow valve.

These and other objects of the present invention will become apparent to those skilled in the art as the description proceeds.

The present invention may be described with greater specificity and clarity with reference to the following drawings, in which:

FIG. 1 illustrates a prior art valve in the closed state;

FIG. 2 illustrates a prior art valve in the open state;

FIG. 3 illustrates a mechanically operated embodiment of the present invention and shown in the closed state;

FIG. 11 illustrates the embodiment of the present invention illustrated in FIGS. 6, 7, and 8 usable to control the fluid flow in a fluid dispensing apparatus.

Figure 4:
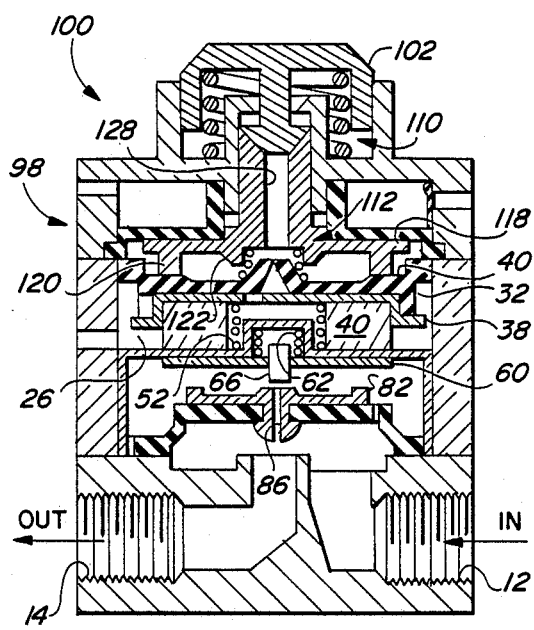
FIG. 4 illustrates a mechanically operated embodiment of the present invention and shown in the open state.

Referring to FIG. 1, there is shown a prior art valve 10 and a first mode to operate this valve for regulating fluid flow from inlet 12 to outlet 14 through the valve. Actuation of the valve is effected by a remote pneumatic push-button 16. On actuation of the push-button, a flow of air is forced through conduit 18, metering device 20 and conduit 22 through inlet port 24 of valve 10. The air enters a chamber 26 defined by housing 28, bulkhead 30 extending across the interior of the housing and diaphragm 32. The diaphragm includes a central opening 34 openable in response to upward deflection of central portion 36 of the diaphragm. A retaining plate 38 is adhesively or otherwise secured to the under surface of annular band 40 of diaphragm 32. An aperture 42 is disposed in the central part of the retaining plate to permit fluid communication from within chamber 26 to opening 34. The retaining plate supports in a depending relationship an annular magnet 44. A further chamber 46 in fluid communication with opening 34 is defined by diaphragm 32 and the sidewalls and cover of housing 28. An exhaust port 48 interconnects chamber 46 with the atmosphere. Thereby, the air injected into chamber 26 by pneumatic push-button 16 flows from chamber 26 through aperture 42 to raise central portion 36 of diaphragm 32 in response to the slight pressure rise intermediate retaining plate 32 and the diaphragm to permit airflow through opening 34 into chamber 46 and through exhaust port 48.

After pneumatic push-button 16 has injected a burst of air into chamber 26, further operation of valve 10 will be described with joint reference to FIGS. 1 and 2. On release of push-button 16, a below ambient air pressure environment will be created therein. This low pressure environment will tend to draw air from within cavity 26 through inlet port 24, conduit 22, metering device 20 and conduit 18. Simultaneously, the cessation of air pressure intermediate retaining plate 38 and central portion 36 of diaphragm 32 will draw the central portion adjacent the retaining plate, as illustrated in FIG. 2. Such repositioning of the central portion will cause the diaphragm to cover aperture 42. This repositioning is aided by bias means, such as coil spring 50 extending from the cover of housing 28 against central portion 36. The closing of aperture 42 precludes airflow threrthrough into chamber 26. The continuing flow of air from within chamber 26 to pneumatic push-button 16 will reduce the pressure within the chamber. Such pressure reduction, together with the higher ambient air pressure present within chamber 46 by means of exaust port 48, will force diaphragm 32 downwardly. The resulting downward movement of magnet 44 will place it proximate bulkhead 30.

The magnetic field created by magnet 44 is not shielded by bulkhead 30 and will magnetically attract disc 60. Such attraction will draw the disc upwardly in proximity of or adjacent bulkhead 30 and against bias means, which may be a coil spring 62 acting against the disk and extending downwardly from within an inverted cup 64 of the bulkhead. The disc includes a centrally located downwardly depending stopper 66.

The valving function performed by valve 10 to regulate fluid flow intermediate inlet 12 and outlet 14 will be described with joint reference to FIGS. 1 and 2. A chamber 70 is in fluid communication with inlet 12. Similarly, a chamber 72 is in fluid communication with outlet 14. An upwardly extending passageway 74 having an upper edge 76 is in fluid communication with chamber 72. A diaphragm 78 extends across chamber 70 and passageway 74 to define in combination with bulkhead 30 and skirt depending therefrom or the sidewalls of housing 28 a further chamber 80. A seat 82 is attached, adhesively or otherwise, to the central part of diaphragm 78. The seat includes a downwardly extending stopper section 84 for sealing engagement with edge 76 of passageway 74. A passageway 86 extends through the stopper section to provide fluid communication between chamber 80 and passageway 74. As is evident from FIG. 1, stopper 66 extending from disc 60 is positioned and configured to seal the upper end of passageway 86 when the disc is in its lower position. An aperture 88 which may be pin hole sized, is formed in diaphragm 78 to interconnect chamber 70 in fluid communication with chamber 80.

In the closed state of valve 10, as illustrated in FIG. 1, a degree of pressure is present in chamber 70 due to the pressure of the fluid attempting to flow into valve 10 through inlet 12. A portion of the fluid under pressure flows through aperture 88 to pressurize chamber 80.

The pressure within this chamber acts upon diaphragm 78 and attached seat 82 to force stopper section 84 into sealing engagement with edge 76 of passageway 74. Flow through passageway 86 is inhibited by stopper 66 of disc 60 in response to the force exerted by coil spring 62. Accordingly, no flow of fluid from inlet 12 through valve 10 to outlet 14 will occur.

On raising of disc 60 due to the magnetic attraction exerted by magnet 44, stopper 66 is raised and passageway 86 is opened. The pressure differential formerly in existence between chamber 80 and chamber 72, which maintained diaphragm 78 in its downward position, dissipates as a result of fluid flow from within chamber 80 through passageway 86 into passageway 74. And, the pressure acting upon the underside of diaphragm 78 due to the pressure present within cavity 70 will force the diaphragm upwardly. The upward relocation of the diaphragm will unseat stopper section 84 and permit fluid flow directly from cavity 70 into passageway 74. Accordingly, inlet 12 has now been placed in fluid communication with outlet 14 and fluid flow therebetween will occur.

For reasons stated above, chamber 26 is at below ambient air pressure, which pressure maintains magnet 44 in its lower position. By incorporating a metering device 20 in fluid communication with chamber 26 through conduit 22 and inlet port 24, it is possible to regulate the extent of time for which a below ambient pressure will be present within chamber 26. That is, inflow of air through metering device 20, as represented by arrow 50 will be regulated to flow into chamber 26 at a controlled rate. The resulting pressure rise within chamber 26 will diminish the force of the ambient air pressure within chamber 46 acting upon the top side of diaphragm 32 until at some point, biasing means or coil spring 52 will be capable of forcing retaining plate 38 and attached magnet upwardly. Upward movement of the magnet will, as a function of distance, reduce the magentic effect upon disc 60. The reduced magnetic effect will, at some point, be overpowered by the downward force exerted by coil spring 62 agains the disc. Thereafter, the disc will be forced downwardly adjacent seat 82. Upon such relocation of the disc, passageway 86 will be sealed by stopper 66. The pressure then present within cavity 70 is greater than the pressure present in the fluid flow through passageway 74 simultaneously, the pressure present within cavity 70 will be translated into chamber 80 through pin hole 88. As the pressure present above seat 82 (within chamber 80) is greater than the pressure present below the seat and within passageway 74, seat 82 will be forced downwardly until stopper section 84 engages edge 76 of passageway 74. Upon such repositioning of seat 82, fluid flow between inlet 12 and outlet 14 will cease. Accordingly, metering device 20 is capable of regulating the extent of time of fluid flow between inlet 12 and outlet 14 subsequent to actuation of pneumatic push-button 16. The degree of time delay until valve 10 is closed, may be setable by adjustments attendant metering device 20.

This first mode of operation allows valve 10 to be used as a metering valve with delayed shut off of the fluid flow.

A second mode of operation of valve 10 is to connect pneumatic push-button 16 with conduit 18 to exhaust port 48 instead of inlet port 24 and leave the inlet port open. At the same time no metering device is mounted in the conduit. When this push-button is actuated, a flow of air is forced through conduit 18 and exhaust port 48 into chamber 46.

The pressure increase in chamber 46, with the help of bias means, such as coil spring 50 extending from the cover of housing 28 against central portion 36 of diaphragm 32 will force this central portion down against the retaining plate 38 and cover aperture 42. The continuing flow of air into chamber 46 will require more volume, such that it forces chamber 46 to expand. This expansion of chamber 46, will require a contraction of the volume in chamber 26 and thus expell air through inlet port 24.

As magnet 44 is lowered, its magnetic attraction upon disc 60 is increased until at some point the attraction is greater than the force exerted by coil spring 62. Thereafter disc 60 is raised against or into proximity with the lower surface of bulkhead 30. For reasons stated above, fluid flow between inlet 12 and outlet 14 will now occur.

On release of pneumatic push-button 16, air will flow back out of the expanded chamber 46 through exhaust port 48 and conduit 18 into the increased volume of the push-button, and a commensurate airflow into chamber 26 will occur through inlet port 24. This way diaphragm 32, the retaining plate 38 and the magnet 44 are raised and the magnetic attraction upon disc 60 will be diminished until the force of coil 62 is sufficient to downwardly reposition the disc against seat 82. The resulting cessation of flow through passageway 86 effected by stopper 66 will terminate further flow between inlet 12 and outlet 14.

This second mode of operation allows valve 10 to be used as a non-metering valve, which will stay open as long as the push-button is activated.

From the above description, it becomes evident that the above-described first and second modes of operation are mutually exclusive.

If a first pneumatic pushbutton with a timing device is attached at inlet port 24, and a second pneumatic push-button without timing device is attached to exhaust port 48, actuating he first pneumatic push-button will cause an airflow into chamber 26 and through opening 42 into chamber 46 and into the second pneumatic push-button; both chambers will then become pressurized above ambient pressure.

When the first pneumatic push-button is released, there will be an airflow from chamber 46 to chamber 26 to the first pneumatic push-button, where a below ambient pressure was created caused by its release. This airflow helped by bias means, such as coil spring 50 will cause center portion 36 of the diaphragm to block off opening 42. This closure of chamber 46 will cause this chamber, even when expanded downwards, as explained below, to stay under above ambient pressure The continuing flow of air from chamber 26 to the first pneumatic push-button will reduce the pressure within the chamber and will cause the magnet 44 down to open the valve.

Slowly, air entering the timing device connected to the first pneumatic push-button will raise the below ambient pressure environment within chamber 26 until it has been raised to ambient pressure However, as an above ambient pressure prevails in chamber 46, magnet 44 will stay down and the valve will remain open.

It is mainly out of a search to solve these problems, that the present invetnion originated. Mainly by adding a differently engineered top valve body, including new engineered parts and membranes, there has been added some major new modes of operation plus an enormous flexibility in using these modes of operation in a mutually non-exclusive manner.

The first improvement made to the valve 10 was the addition of a third mode of operation. It consists of a one piece push-button that, actuated from the outside, directly relocates the magnet to control the fluid flow. This mode of operation may be referred to as a non-metering mechanical push-button mode.

A second improvement was to modify the mechanical push-button mode of operation to incorporate a metering control mechanism. However, while both of these improvements work mutually non-exclusively with the first mode of operation (vacuum with metering), they do not work with the second mode of operation (pressure without metering). The present invention was developed to overcome these limitations.

The purpose of the present invention is to offer full flexibility in the usage of the valve, by allowing it to be operated by any of the three following different modes of operation whether actuated separately, in any combination of two, and even all three together, and whether metered or non-metered: pneumatic vacuum operation mechanical; pressure operation created by a pneumatic force; and mechanical pressure operation created by a mechanical force.

To provide a better understanding of the operation and benefits attendant the present invention over valve 10 (FIG. 1 and 2) reference will be made to schematic drawings shown in FIGS. 12a–12f. Valve 10 basically consists of four chambers (1-4) having the following functions:

chamber 1: The fluid inlet and outlet chamber;
chamber 2: The pressure differential control chamber which allows the membrane in between chamber 1 and 2 to control the flow between the inlet and outlet parts of chamber 1;
chamber 3: The vacuum chamber, in which vacuum can be created to relocate the magnet; and
chamber 4: The pressure chamber, in which pressure can be created to relocate the magnet. Chambers 1 and 2 are part of the fluid side of valve 10 and have no connections with chamber 3 and 4 of the control side of the valve. It is to be noted that when chamber 3 was used as the vacuum chamber, chamber 4 needed to be an open chamber under ambient pressure. These characters are basically the cause of the mutual exclusive characteristics of valve 10.

FIG. 12 a provides a representation of valve 10. FIG. 12b illustrates how chamber 3 is used as a vacuum chamber (as in the first mode of operation described above in detail). It illustrates that chamber 3 can be sealed off with vacuum by the membrane in between chamber 3 and 4; that a timing device is attached to the inlet of chamber 3; and that chamber 4 is open to the ambient air. FIG. 12c illustrates how chamber 4 is used as a pressure chamber (as in the second mode of operation described in detail above). It illustrates that chamber 4 can be sealed off with pressure by the membrane in between chamber 3 and 4; and that chamber 3 is open to the ambient air. FIG. 12d illustrates the first support, where a mechanical push-button is used to relocate the magnet. Whether chambers 3 and 4 are closed or not, is not essential for this mode of operation. FIG. 12e illustrated the second improvement, where the mechanical push-button is used with a metering device. It illustrates that a vacuum can be created as the push-button lets air escape via chamber 4 to the ambient air, that a metering device is attached to the inlet of chamber 3, and that chamber 3 can be sealed off with vacuum by the membrane in between chamber 3 and 4. FIG. 12 f illustrates the present invention. With an additional membrane, a fifth chamber is completely sealed off from the fourth chamber, and by the inclusion in chamber 4 of a mechanical pressure transducing anchor which is independent of the push-button, the different chambers are assigned a different function: Chamber 1 is the fluid inlet and outlet chamber; Chamber 2 is the fluid pressure differential control chamber; Chamber 3 is the vacuum chamber, and never needs to be a chamber open to ambient air as was previously required to operate the valve in a non-metering pressure activated manner; Chamber 4 is open (ambient) chamber, and never needs to be a pressure chamber, as was previously required to operate the valve in a non-metering pressure activated manner; and Chamber 5 is an independent pressure chamber.

The essential difference between valve 10 and the present invention is that a plurality of modes of operation are possible, which may be simulaaneous and which are not mutually exclusive. The use of an independent mechanical pressure transducing anchor allows this anchor to be operated by either the pressure chamber (5) membrane or either the external push-button or together therewith. It is to be understood that the anchor does not encumber any of the characteristics of the prior art modes of operation (see Drawings 2 to 5).

Referring now to FIGS. 3 and 4, there will be described a valve 98 which is an improvement over and which is a mechanically operable embodiment 110. For the sake of simplicity in description and clarity, elements in this embodiment common to valve 10 will be assigned like reference numerals. Valve 98 includes a push-button 102 biased into the extended position by a coil spring 104 or the like. A shroud 106 may be incorporated to prevent unwanted lateral displacement of the push-button. A prong 108 extends downwardly from push-button 102, which prong is captured against unwanted extension by retaining member 110. The prong acts against an independent pressure transducing anchor 112 having a central cylinder 114 slidably retained by the sidewall 116 of retaining member 110. The anchor further includes a plate 118 having a downwardly extending annular protrusion 120 circumscribing a second downwardly extending annular protrustion 122. Annular protrusion 120 is approximately coincident with annular band 40 of diaphragm 32 while annular protrusion 122 is approximately coincident with central portion 36 of the diaphragm. Annular protrusion 122 also defines a depression 124 for receivingly retaining coil spring 50. It is important that annular protrusion 122 be configured such that central portion 36 of diaphragm 32 is not pushed adjacent retaining plate 38, and thus leave aperture 42 uncovered. Is is to be noticed that the anchor has a centrally located channel 128 that will allow free flow of air through this anchor.

On depressing push-button 102, anchor 112 is forced downwardly. Downward movement of the anchor produces a downward movement of diaphragm 32, retaining plate 38 and magnet 44 as a result of the downward force exerted upon the annular band 40 by annular protrusion 120. The air within chamber 26 is expelled therefrom through inlet port 24 via aperture 42 in retaining plate 38 through the central opening of the diaphragm 32, along channel 128 of anchor 112 and the interstices between push-button 102 and shroud 106. As magnet 44 is lowered, its magnetic attraction upon disc 60 is increased until at some point the attraction is greater than the force exerted by coil spring 62. Thereafter, disc 60 is raised against or into proximity with the lower surface of bulkhead 30. For reasons stated above, fluid flow between inlet 12 and outlet 14 will now occur.

On release of push-button 102, retaining plate 38 will rise on response to the force exerted by coil spring 52 and a commensurate air flow into chamber 26 will occur through inlet port 24. As magnet 44 is raised, its magnetic attraction upon disc 60 will be diminished until the force of coil 63 is sufficient to downwardly reposition the disc against seat 82. The resulting cessation of flow through passageway 86 effected by stopper 66 will terminate further flow between inlet 12 and outlet 14.

From the above description, it becomes evident that embodiment 100 of valve 98 will remain open commensurate with the pressure of a force depressing push-button 102. On removal of such force the valve will be automatically closed.

Figure 5:
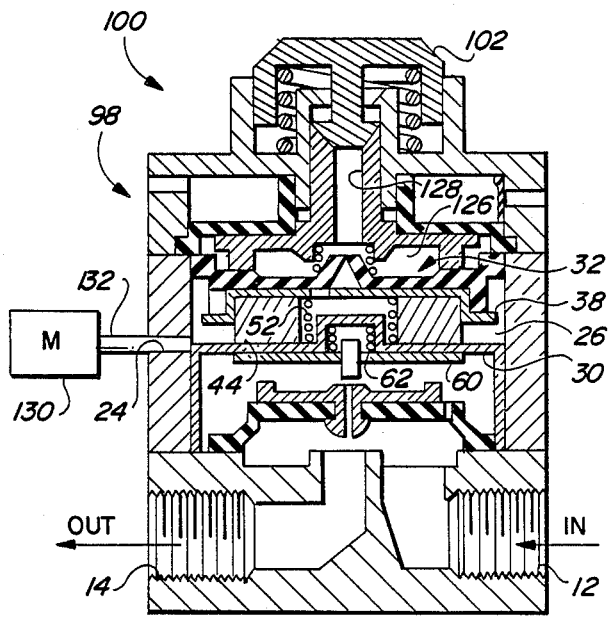
FIG. 5 illustrates a metering control usable in conjunction with the embodiment shown in FIGS. 3 and 4.

Referring to FIG. 5, there is shown a means for maintaining embodiment 100 of valve 98 open for a predetermined time subsequent to release of push-busson 102. A metering device 130 is pneumatically secured to inlet port 24 through conduit 132. The metering device includes a means for permitting air flow into conduit 132 at a setable controlled rate. As discussed above, in the depressed state of push-button 102, the volume of chamber 26 has been diminished by an outflow of air via aperture 42 in retaining plate 38 through the central opening of diaphragm 32 along channel 128 of anchor 112 and the interstices between push-button 102 and shroud 106. Because of the presence of the metering device pneumatically in communication with chamber 26, an automatic air inflow through inlet port 24 will not occur in response to an attempted upward movement of diaphragm 32 in response to the force of coil spring 52. Since such upward movement is inhibited by the pressure differential between the below ambient pressure within chamber 26 and the atmospheric pressure present in the space 126 above the diaphragm; space 126 is in fluid communication with the atmosphere through the nonpneumatically sealed components of the push-button assembly. Thus, the retaining plate will be retained in its lowered state by the pressure differential. Such lowered state will also maintain disc 60 approximate or adjacent bulkhead 30 and fluid flow between inlet 12 and outlet 14 will continue.

The pressure differential can be reduced by permitting metering device 130 to bleed air into chamber 26 at a controlled area. The time delay between the release of push-button 102 until flow intermediate inlet 12 and outlet 14 will cease, is a function of the rate of air bleed. As air bleeds into chamber 26, the pressure differential across diaphragm 32 is slowly reduced until at some point diaphragm 32 will be raised sufficiently as a result of the force exerted by coil spring 52 to draw magnet 44 out of sufficient magnetic influence upon disc 60 to retain the disc and thereafter it will be forced downwardly by its coil spring 62; and, the valve will close to preclude further flow between inlet 12 and outlet 14.

Figure 6:
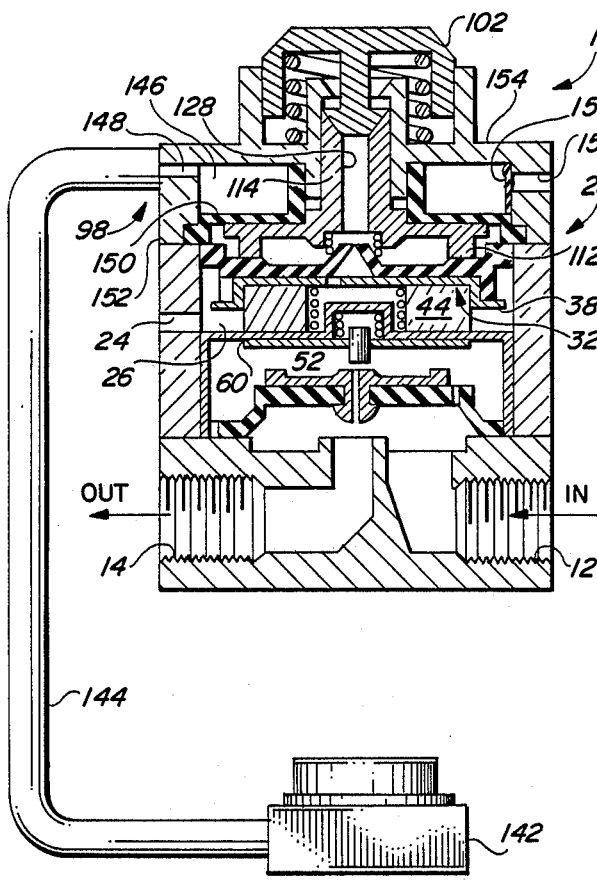
FIG. 6 illustrates a pneumatically operated pressure responsive embodiment of the present invention shown in the open state.
Figure 7:
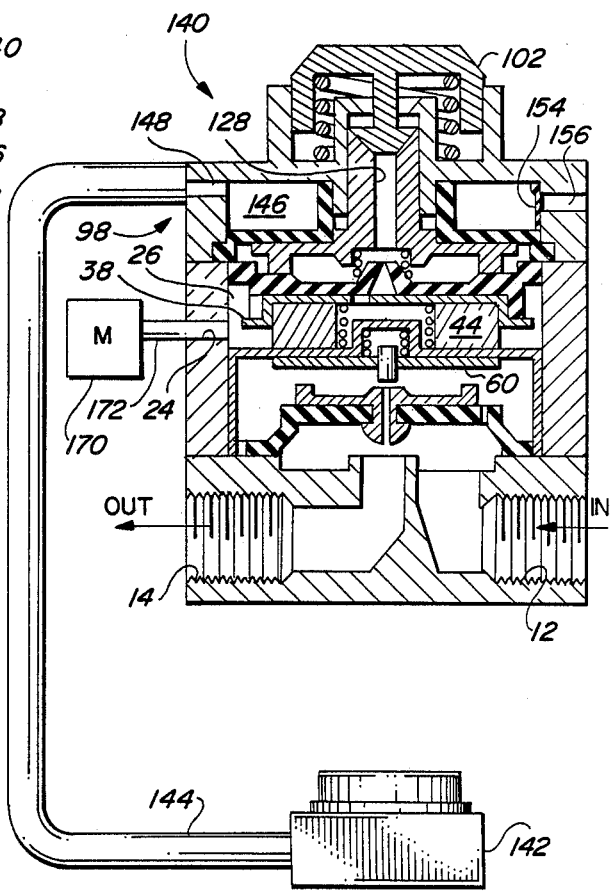
FIG. 7 illustrates a metering control mechanism usable in conjunction with the embodiment shown in FIG. 6.

Referring now to FIGS. 6 and 7, there will be described embodiment 140 of valve 98 which is pneumatically operated. A pneumatic push-button 142 being depressed, forces a flow of air through conduit 144. The conduit is in fluid communication with an expandable annular chamber 146 via inlet port 148. The annular chamber is formed by an annular diaphragm 150 in sealed engagement with sidewall 152 and top 154 of housing 28. The annular chamber includes a further inlet port 156, which port is sealed for one-way flow by a flapper valve 158. That is, flow through the inlet port into annular chamber 146 will occur upon the presence of a below atmospheric pressure within the annular chamber through inward bending or distending of the flapper valve; however, the flapper valve will preclude an outflow of air through inlet port 156.

In operation, upon actuation of pneumatic push-button 142, air will flow into annular chamber 146 and cause a pressure rise therein. The pressure rise will exert a force upon diaphragm 150 to force the latter downwardly. Downward excursion of the diaphragm will result in a commensurate downward movement of anchor 112. The downward movement of the anchor is not inhibited by push-button 102 as prong 108 includes a cone-shaped lower end for engagement with cylinder 114 which permits downward movement of the cylinder independent of the prong. Downward movement of anchor 112 will bring about a downward movement of diaphragm 32 and attached retaining plate 38. The commensurate downward movement of magnet 44 will bring about a magnetic attraction of disc 60 to raise it. Upon upward movement of disc 60, valve 98 will open and fluid flow will occur between inlet 12 and outlet 14.

On release of pneumatic push-button 142, a flow of air will be drawn thereinto from annular cavity 146 and permit diaphragm 140 to contract to its steady state condition. Such contraction permits the force of coil spring 52 to cause an upward movement of retaining plate 38 which results in commensurate upward movement of diaphragm 32 and anchor 112 to raise magnet 44 out of magnetic influence with disc 60. The disc will thereafter be lowered in response to coil spring 52 and valve 98 will be turned off to prevent further fluid flow between inlet 12 and outlet 14.

Although the pneumatic system represented by pneumatic push-button 142, conduit 144 and annular chamber 146 is intended to be a closed system, some leakage to the atmosphere may occur. To insure that actuation of pneumatic push-button 142 will always bring about a sufficient expansion and downward movement of diaphragm 150 in response to pressure within annular cavity 146, means must be provided to replenish any air which may have leaked out from within the closed pneumatic system. Such means is, for example, provided by inlet 156 and flapper valve 158. That is, whenever annular cavity 146 is below ambient pressure, air will flow through inlet port 156 into the annular cavity will occur. Thus, compensation is provided to accomodate any loss of air from within the closed system represented by pneumatic push-button 142, conduit 144 and annular cavity 146.

It may be noted that valve 98 will only remain open so long as pressure is present within annular cavity 146. Under certain circumstances, it may be preferable to delay closure of valve 98 after actuation of pneumatic push-button 142. Such delay is available from the apparatus illustrated in FIG. 7. The operation of valve 98 as described with respect to embodiment 140 illustrated in FIG. 6 results in an evacuation of air from within chamber 26, via aperture 42 in retaining plate 38 through the central opening of diaphragm 32, along channel of anchor 112 and the interstices between push-button 102 and shroud 106. However, by attaching a pneumatic metering device 170 to inlet port 24, and after withdrawl of the above atmospheric pressure within annular cavity 146, upward movement of the retaining plate in response to the force of coil spring 52 will be restrained as air inflow to chamber 26 is restricted by metering device 170. Thus, magnet 44 can be maintained in magnetic influence upon disc 60 for predeterminable time period as a function of the air bleed through metering device 170. Accordingly, cessation of flow between inlet 12 and outlet 14 can be delayed after cessation of the influence of pneumatic push-button 142 for a period of time.

Figure 8:
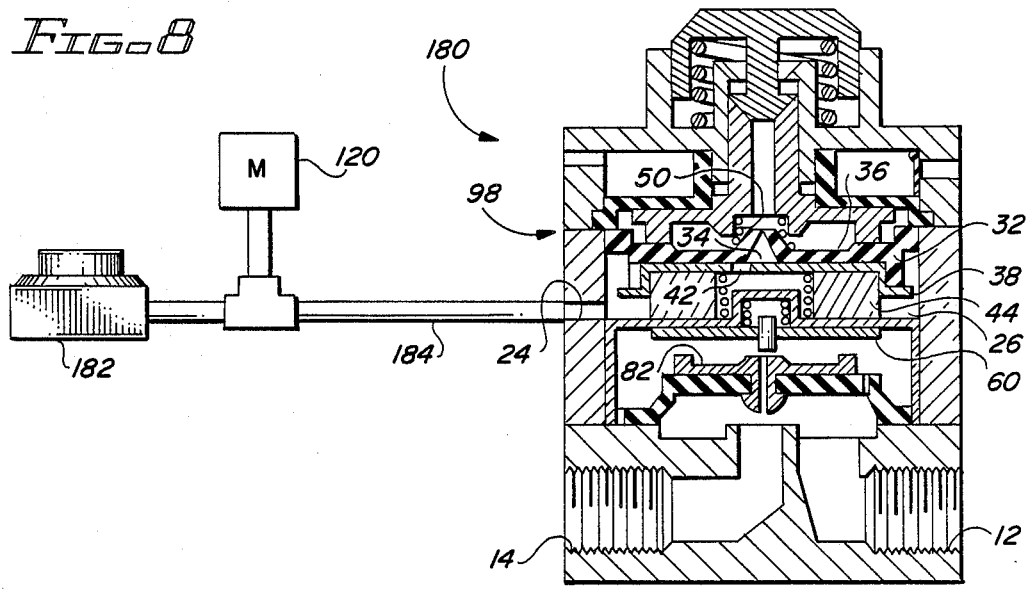
FIG. 8 illustrates a pneumatically operated vacuum responsive embodiment of the present invention and incorporating a metering control mechanism.

In FIG. 8, there is shown an embodiment 180 of a valve 98 which incorporates the prior art means for actuating the valve. A pneumatic push-button 182, of the type illustrated in FIGS. 1 and 2, may be connected with a metering device 120, through a conduit 184 with inlet port 24.

In operation, on actuation of pneumatic push-button 182, air is forced into chamber 26 which air flows through aperture 42 in retaining plate 38 to the atmosphere via opening 34 in central part 36 of diaphragm 32, along channel 128 of anchor 112 and the interstices between the push-button 102 and shroud 106. On release of pneumatic push-button 182, central part 36 of diaphragm 32 is forced downwardly to sealingly cover aperture 42 as a result of the force exerted by coil spring 50 and as a below ambient pressure environment is developed within chamber 26 due to action of pneumatic push-button 182. The resulting pressure differential across diaphragm 32 will cause ambient air pressure to act upon the upper surface of the diaphragm to lower it and force attached retaining plate 38 and magnet 44 downwardly. At some point, disc 60 will be magnetically attracted to magnet 44 and the disc will be raised above seat 82. Thereafter, flow between inlet 12 and outlet 14 will occur.

Bleed air may be introduced to chamber 26 by metering device 120 (if used) to permit a controlled or regulated reduction of the pressure differential across diaphragm 32. Such reduction will permit, at some point, raising of retaining plate 38 with a commensurate raising of the magnet and reduction of the magnetic attraction upon disc 60 to permit the disc to become reseated upon seat 82. Thus, valve 98 will be closed at a point in time delayed from release of pneumatic push-button 182.

Figure 9:
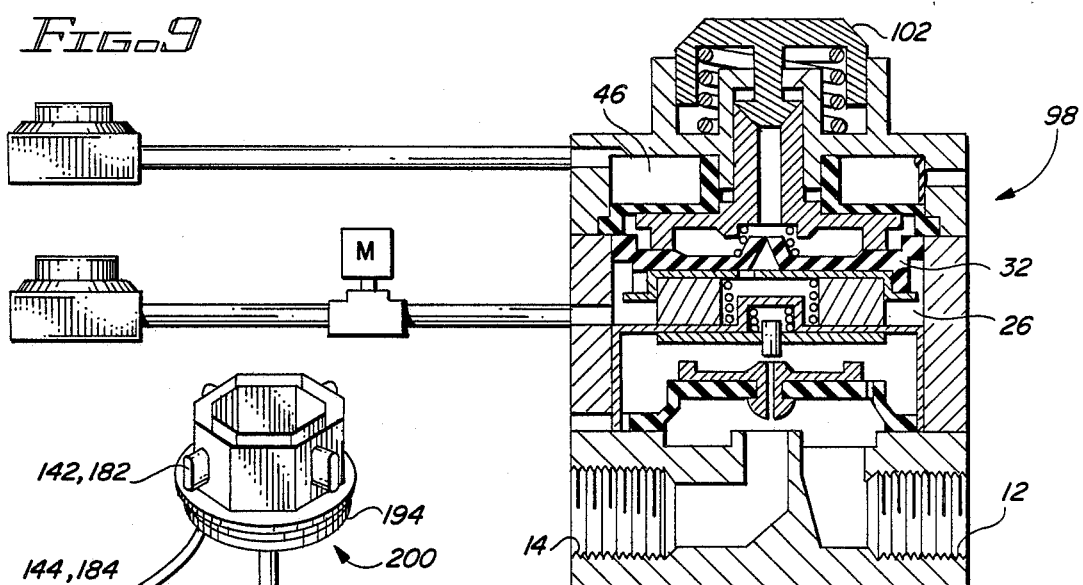
FIG. 9 illustrates an embodiment of the present invention having a plurality of mechanically and pneumatically operable control systems.

Referring to FIG. 9, there is shown a valve 98 which may be actuated by any of the three actuating devices described above. First, the valve may be actuated mechanically by depressing push-button 102, as described with respect to embodiment 100. Secondly, it may be actuated by operation of pneumatic push-button 142 to create a pressure rise within annular cavity 146, as described with respect to embodiment 140. Third, it may be actuated by operation of pneumatic push-button 182 to develop a below ambient pressure within chamber 26, as described with respect to embodiment 180. It is to be appreciated that the combined use of these three modes of operation does not present mutually exclusive conditions that prevent operation of the valve.

Figure 10:
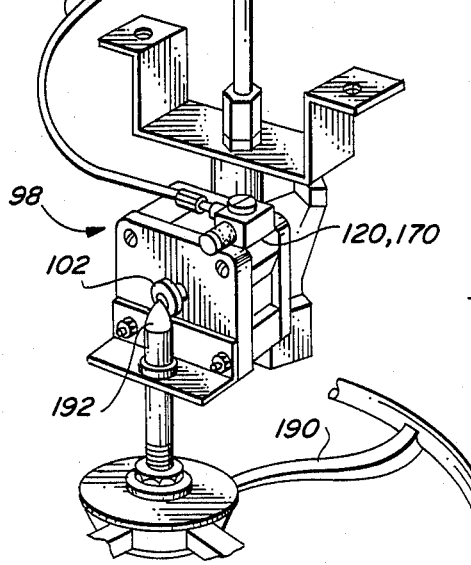
FIG. 10 illustrates the embodiment of the present invention illustrated in FIGS. 3 to 5 usable for controlling fluid flow through a fluid dispensing device.
Figure 12A:
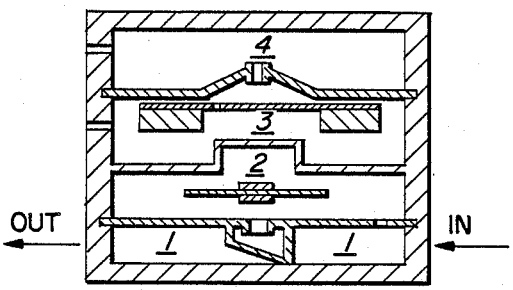
FIGS. 12a-12f are schematic diagrams which illustrate the prior art valves and the present invention and provide a comparison therebetween.
Figure 12B:
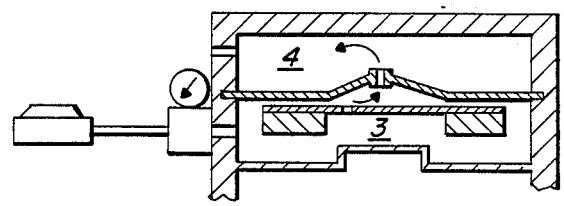
Figure 12C:
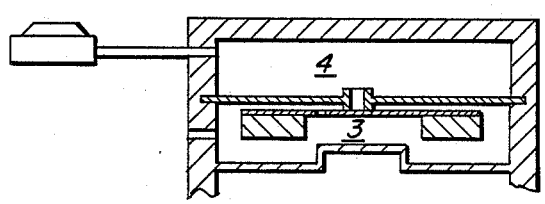
Figure 12D:
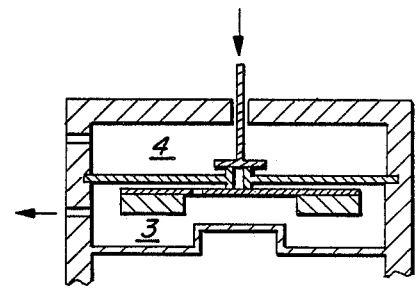
Figure 12E:
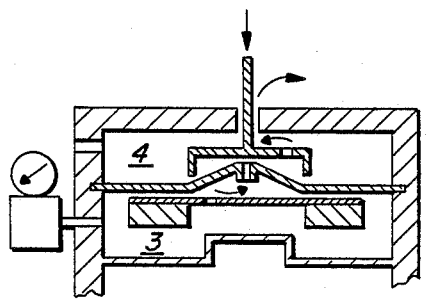
Figure 12F:
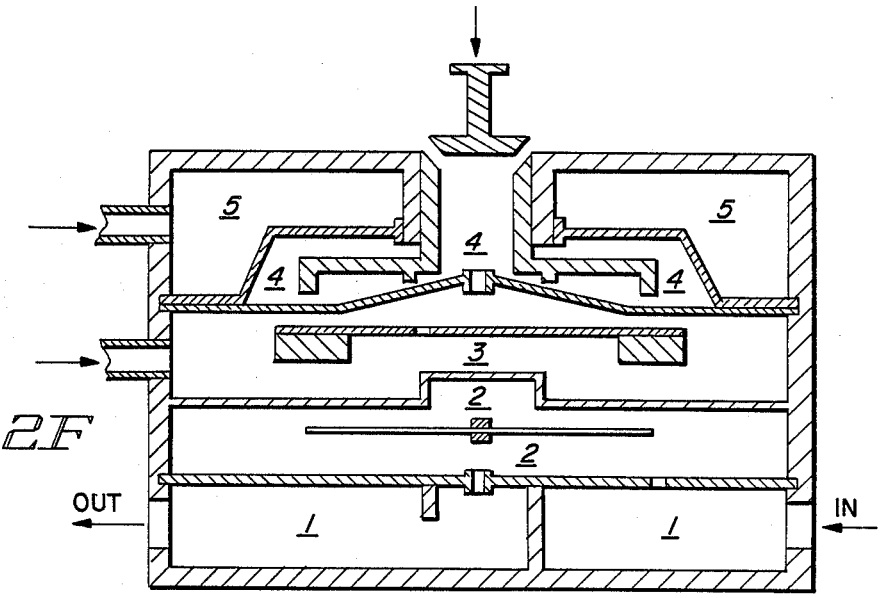

FIG. 10, illustrates a combination of embodiment 100, 140 and/or 180 of valve 98 usable in conjunction with a water dispensing device. This clearly illustrates the flexibility in usage of the pneumatical and the mechanical actuation systems simultaneously, without any problems of mutual exclusivity.

Referring to FIG. 10, there is illustrated an environment within which push-button operated embodiment 100 of valve 98 is particularly usable A foot actuated pedal 190, through various mechanical arrangements, can be caused to raise a tapered pin 192. The pin acts against push-button 102 to depress the same. Upon depressing the push-button, valve 98 will permit water flow therethrough from a source of water under pressure to a water dispensing ring 194 or a similar device. A pneumatic push-button 142/182 provides a source of air under pressure through conduit 144/184 to valve 98. The valve may include a metering device 170/120. On actuation of pneumatic push-button 142/182, valve 98 is opened to permit a flow of water therethrough from a source of water under pressure to a water distribution device 200. Devices of this type illustrated in FIG. 10 are often used in locker rooms, washrooms, or similar environments having a circular or other wash basin with a certrally mounted water dispensing ring or device to permit a plurality of persons to wash simultaneously.

FIG. 11 illustrates a combination of embodiment 100 and 140 of valve 98. A pneumatic push-button 142 provides a source of air under pressure through conduit 144 to valve 98. A push-button 102 provides a source of mechanical pressure. The valve may include a metering device 120. When actuating push-button 102 and 142, separately or simultaneously, valve 98 will permit water under pressure flow therethrough from a source of water under pressure to a water dispensing spray nozzle 202 or a similar device.

While the principles of the invention have now been made clear in an illustrative embodiment, there will be immediately obvious to those skilled in the art many modifications of structure, arrangement, proportions, elements, materials, and components, used in the practice of the invention which are particularly adapted for specific environments and operating requirements without departing from those principles.

I claim:

1. A valve for regulating fluid flow between an inlet and an outlet and having a magnet positionable between a first state to a second state and located in a first chamber defined by a bulkhead, a diaphragm and sidewall, means for urging the magnet to the first state and a magnetically responsive disc positionable within a second chamber in response to repositioning of the magnet for regulating flow intermediate the inlet and the outlet by inhibiting flow when in a first state and by accommodating flow when in a second state in response to the first and second states, respectively, of the magnet, the improvement comprising in combination:
    (a) a push-button for actuating said valve;
    (b) an anchor positionally responsive to said push-button for relocating the diaphragm;
    (c) mechanical means for translating movement of said push-button to said anchor; and
    (d) means for repositioning the magnet to its second state in response to relocation of the diaphragm and against the force exerted by the urging means;
whereby, on actuation of said push-button the disc magnetically responds to the magnet to regulate the flow intermediate the inlet and outlet.

2. The valve as set forth in claim 1 including means for delaying the influence of the urging means to return the magnet to its first state.

3. The valve as set forth in claim 1 including a source of pressure and means responsive to said source of pressure for repositioning said anchor independent of operation of said push-button.

4. The valve as set forth in claim 3 including means for delaying the influence of the urging means to return the magnet to its first state.

5. The valve as set forth in claim 1 including means for reducing the pressure within the first chamber, means included with the diaphragm responsive to the reduction in pressure within the first chamber for relocating the diaphragm independent of operation of said push-button.

6. The valve as set forth in claim 5 including means for delaying the influence of the urging means to return the magnet to its first state.

7. The valve as set forth in claim 3 including means for reducing the pressure within the first chamber, means included with the diaphragm responsive to the reduction in pressure within the first chamber for relocating the diaphragm independent of operation of said push-button.

8. The valve as set forth in claim 7 including means for delaying the influence of the urging means to return the magnet to its first state.

9. A method for actuating a valve to regulate fluid flow between an inlet and an outlet by repositioning a magnet located in a first chamber between a first state and a second state to magnetically influence the state of a disc located in a second chamber and to reposition the disc between a first state and a second state to restrict and accommodate, respectively, fluid flow between the inlet and the outlet, said method comprising the steps of:
    (a) mechanically relocating the magnet from its first state to its second state to relocate the disc from its first state to its second state;
    (b) said step of relocating including the step of exerting the magnetic force of the magnet directly upon the disc to carry out said step of relocating;
    (c) returning the magnet to its first state on completion of said step of relocating to withdraw the effective magnetic field of the magnet away from the disc to a degree sufficient to permit relocation of the disc to its first state;
    (d) contracting the first chamber within the valve independent of carrying out said relocating step; and
    (e) translating the contraction of the first chamber into repositioning of the magnet from its first state to its second state to urge relocation of the disc to its second state.

10. The method for actuating a valve as set forth in claim 9 including the step of delaying the rate of return of the magnet to its first state during said returning step.

11. The valve as set forth in claim 9 including the step of delaying the rate of return of the magnet to its first state during said returning step.

12. A method for actuating a valve having first, second and third chambers to regulate fluid flow between an inlet and an outlet by repositioning a magnet located in the first chamber between a first state and a second state to magnetically influence the state of a disc located in the second chamber and to reposition the disc between a first state and a second state to restrict and accommodate, respectively, fluid flow between the inlet and the outlet, said method comprising the steps of:
    (a) mechanically relocating the magnet from its first state to its second state to relocate the disc from its first state to its second state;
    (b) said step of relocating including the step of exerting the magnetic force of the magnet directly upon the disc to carry out said step of relocating;

(c) expanding the third chamber within the valve independent of arraying out said relocating step;

(d) translating the expansion of the third chamber into repositioning of the magnet from its first state to its second state to urge relocation of the disc to its second state; and (e) returning the magnet to its first state on completion of each of said step of relocating and said step of expanding to withdraw the effective magnetic field of the magnet away from the disc to a degree sufficient to permit relocation of the disc to its first state.

13. The method for actuating a valve as set forth in claim 12, including the step of delaying the rate of return of the magnet to its first state during aid returning step.

14. A method for actuating a valve having first, second and third chambers to regulate fluid flow between an inlet and an outlet by repositioning a magnet located in the first chamber between a first state and a second state to magnetically influence the state of a disc located in the second chamber and to reposition the disc between a first state and a second state to restrict and accommodate, respectively, fluid flow between the inlet and the outlet, said method comprising the steps of:

(a) mechanically relocating the magnet from its first state to its second state to relocate the disc from its first state to its second state;

(b) said step of relocating including the step of exerting the magnetic force of the magnet directly upon the disc to carry out said step of relocating; and (c) expanding a third chamber within the valve including the steps of:

(i) translating the expansion of the third chamber into repositioning of the magnet from its first state to its second state to urge relocation of the disc to is second state;

(ii) contracting the first chamber within the valve; and (iii) translating the contraction of the first chamber into repositioning of the magnet from its first state to its second state to urge relocation of the disc to its second state;

(d) carrying out one of said step of mechanically relocating and said step of expanding independently of carrying out of the other;

(e) returning the magnet to its first state on completion the carried out one of said step of relocating and said step of expanding to withdraw the effective magnetic filed of the magnet away from the disc to a degree sufficient to permit relocation of the disc to its first state.

15. The method for actuating a valve as set forth in claim 14 further including the step of delaying the rate of return of the magnet to its first state during said returning step.

16. Apparatus for actuating a magnetic valve that regulates fluid flow between an inlet and an outlet by repositioning a single magnet located in a first chamber between a first state and a second state to magnetically influence a magnetically responsive disc located in a second chamber and to reposition the disc between a first and a second state to restrict and accommodate, respectively, fluid flow between the inlet and the outlet, the said apparatus comprising in combination:

(a) a third chamber having an initial volume;

(b) mechanical means acting upon the magnet for increasing the initial volume of said third chamber;

(c) means for decreasing the initial volume of said third chamber;

(d) means associated with the volume of said third chamber for influencing the location at one of the first and second states of the magnet to control the flow between the inlet and the outlet; and (e) a pressure transducing anchor which transfers the volume changes of said third chamber into relocation between the first and the second state of the magnet to control the valve between the inlet and the outlet.

17. The apparatus as set forth in claim 16, wherein the said anchor includes means for transferring air through said anchor.

18. The apparatus as set forth in claim 17, including a push-button cooperating with said anchor for repositioning the magnet from the first state to control the valve.

19. The apparatus as set forth in claim 16 including means for metering the operation of the valve.

20. A method for actuating a magnet valve that regulates in a metering or non-metering fashion, fluid flow between an inlet and an outlet by repositioning a magent located in a first chamber between a first state and a second state to magnetically influence a magnetically responsive disc located in a second chamber and to reposition the disc between a first and a second state to restrict and accommodate, respectively, fluid flow between the inlet and the outlet, the said method comprising the steps of:

(a) mechanically repositioning the magnet;

(b) pneumatically repositioning the magnet; and (c) said mechanical and pneumatic repositioning steps being capable of being exercised separately, mutually non-exclusively and simultaneously.

21. The method as set forth in claim 20 including the steps of:

(a) creating a vacuum in combination with exercise of said pneumatic repositioning steps and reducing the vacuum to ambient air pressure through a metering apparatus;

(b) said steps of mechanically repositioning including the step of operating a push-button associated with the valve; and (c) altering the volume of a chamber, which chamber is independent of the first and second chambers, by means external to the valve to exert a force upon the magnet and operate the valve.

22. The method as set forth in claim 20, including the steps of:

(a) said pneumatic repositioning step including the step of creating a vacuum and the step of creating an above ambient pressure; and (b) said mechanical repositioning step including the step of creating a direct mechanical force and the step of creating an indirect mechanical force.

23. A valve for regulating fluid flow between an inlet and an outlet and having a magnet positionable between a first state to a second state and located in a first chamber defined by a bulkhead, a diaphragm and sidewall, means for urging the magnet to the first state and a magnetically responsive disc positionable within a second chamber in response to repositioning of the magnet for regulating flow intermediate the inlet and the outlet by inhibiting flow when in a first state and by accommodating flow when in a second state in response to the first and second states, respective, of the magnet, the improvement comprising in combination:

(a) a first push button for providing a mechanical force for actuating the valve;
(b) a second push button for providing an above ambient pressure pneumatic force for actuating the valve;
(c) a third push button for providing a below ambient pressure pneumatic force for actuating the valve;
(d) an anchor positionally responsive to any one of said first, second or third push buttons for relocating the diaphragm; and
(e) means for repositioning the magnet to its second state in response to relocation of the diaphragm and against the force exerted by the urging means;
whereby, on actuation any one of said first, second or third push buttons the disc magnetically responds to the magnet to regulate the flow intermediate the inlet and outlet.

24. The valve as set forth in claim 23 including means for delaying the influence of the urging means to return the magnet to its first state.

25. The valve as set forth in claim 23 including means for accommodating simultaneous operation of any two push buttons of said first, second and third push buttons.

26. The valve as set forth in claim 23, including means for accommodating simultaneously operation of said first, second and third push buttons.

27. A method for actuating a valve to regulate fluid flow between an inlet and an outlet by repositioning a magnet located in a first chamber between a first state and a second state to magnetically influence the state of a disc located in a second chamber and to reposition the disc between a first state and a second state to restrict and accommodate, respectively, fluid flow between the inlet and the outlet, said method comprising the steps of:
(a) actuating one or more of a first push button for mechanically relocating the magnet, a second push button for providing an above ambient pressure pneumatic force for relocating the magnet and a third push button for providing a below ambient pressure pneumatic force for relocating the magnet;
(b) mechanically relocating the magnet from its first state to its second state on relocation of the disc to its second state in response to exercise of said step of actuating; and
(c) returning the magnet to its first state on completion of said relocating step to permit relocation of the disc to its first state.

28. The method for actuating a valve as set forth in claim 27 including the step of delaying the rate of return of the magnet to its first state during said step of returning.

* * * * *